Oct. 22, 1929.  T. H. JACOB  1,732,754
ATTACHMENT FOR TRACTORS
Filed June 5, 1925   2 Sheets-Sheet 2
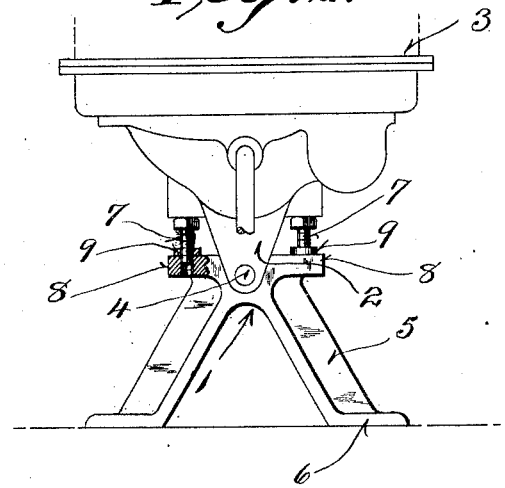
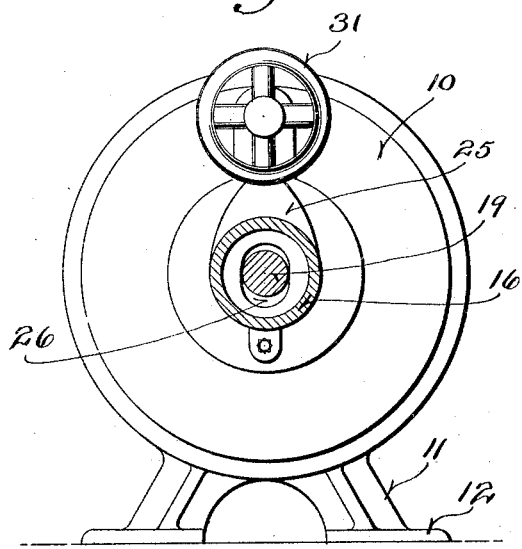
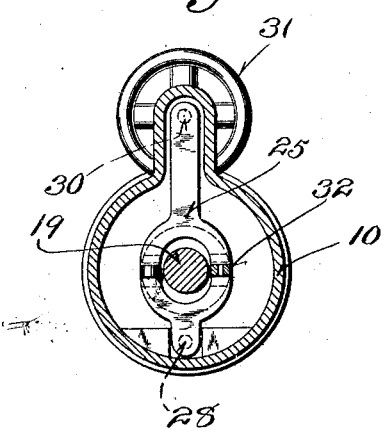
Inventor
Thomas H. Jacob Patented Oct. 22, 1929

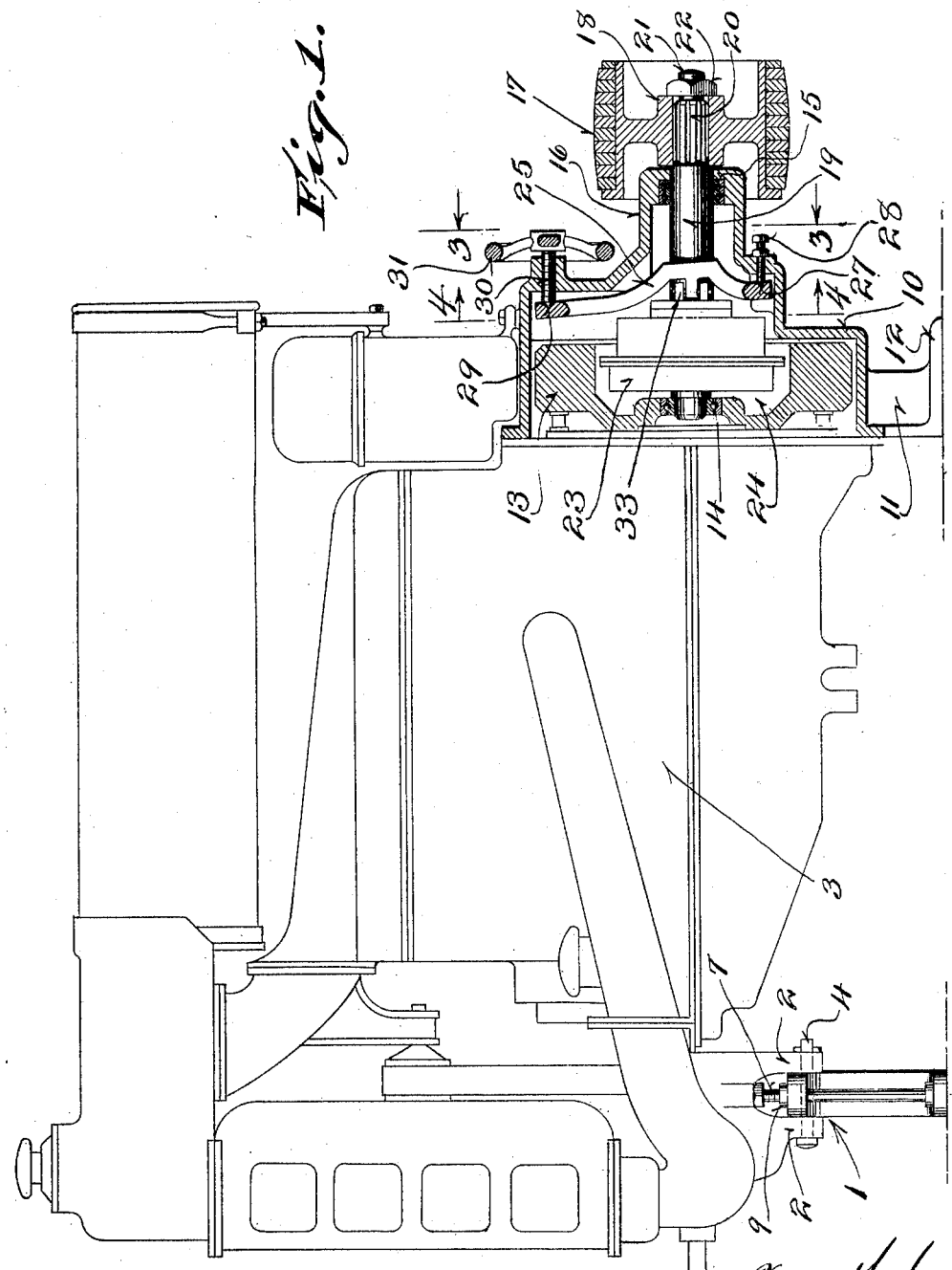

1,732,754

UNITED STATES PATENT OFFICE

THOMAS H. JACOB, OF WAUSAU, WISCONSIN

ATTACHMENT FOR TRACTORS

Application filed June 5, 1925. Serial No. 35,149.

This invention relates to improvements in attachments for tractors.

One of the objects of my invention is the provision of an attachment for standard tractors such as a Fordson and is particularly in the manner of a take-off whereby the power of the tractor may be used for different purposes and wherein nearly all the standard parts of the tractor are used with the exception of a very small change in the construction.

Another object of the invention is the provision of an attachment of the above type in which the clutch control can be very easily and gradually operated to couple the load to the engine, and in which an adjustment is provided for this clutch control, such adjustment being accessible from the outer side of the complete device so that it may be finally adjusted after the complete assembly has been made, thus securing the accurate final adjustment so much desired in this type of work.

An embodiment of this invention is shown in the accompanying drawings, in which:—

Figure 1 is a side elevation of a Fordson engine with parts in section showing the attachment in place.

Figure 2 is a front end view of the device, such view being partly in section.

Figure 3 is a section view on the line 3—3 of Figure 1.

Figure 4 is a section on the line 4—4 of Figure 1.

Referring to Figures 1 and 2, it will be seen that a front support 1 has been provided which fits between the front lugs 2 of the tractor engine 3 and replaces the front axle. This support 1 is coupled to the front lugs by means of a pin 4 and is provided with divergent legs 5 terminating in attaching feet 6, which may be secured to the floor.

A pair of bolts 7 are threaded into outwardly projecting arms 8 of the support 1 and are locked in place by means of lock nuts or locking collars 9, as shown most clearly in Figures 1 and 2.

The rear end of the engine is supported by means of a relatively large casting which has a hollow part or casing 10 provided with a pair of divergent legs 11 equipped with attaching feet 12. This casing surrounds the flywheel 13 of the engine and houses a shaft 19 which is supported at one end by ball bearings 14 carried by the flywheel and at the other end by ball bearings 15 carried by an outwardly projecting extension 16 of the housing 10, such extension projecting beneath the overhanging portion of the pulley 17 and being in close proximity to the hub 18 of such pulley. This shaft is provided with a splined portion 20 engaging the pulley and is provided with a threaded portion 21 upon which the lock nut 22 for the pulley is screwed. The usual Fordson clutch 23 is employed and is positioned within the recess 24 in the flywheel in the usual manner. It is operated by means of a lever 25 which is provided with an elongated aperture 26 (see Figure 3) which loosely surrounds the shaft 19. The lower end of this lever is provided with a recess 27 within which the pointed end of an adjusting bolt 28 fits, such adjusting bolt being screwed through the housing 10 and locked in place by means of a lock nut, as shown most clearly in Figure 1. The upper end of the lever 25 is similarly provided with a recess 29 to receive the pointed end of the controlling screw 30, such controlling screw being provided with an external handwheel 31 whereby the clutch may be operated.

It is to be noted from Figure 4 that the lever 25 is provided with a pair of lugs 32 which are attached to the lugs 33 of the standard clutch 23.

In assembling the device, it is to be noted that the rear casting or housing 10 is secured in place and the front support is attached by means of the pin 4 thus giving a three point suspension for the engine and securing the engine in position without stressing any of its parts. Thereafter, the screws 7 (see Figure 2) are adjusted to engage opposite sides of the front of the engine and are then locked in place thus giving a very secure and firm support.

The exact adjustment for the clutch is initially secured by adjusting the bolt 28. Thereafter, the device may be operated by manipulating the handwheel 31 to gradually apply the load or disconnect it, as desired.

It will be seen that a very simple and effective type of attachment for a standard tractor engine has been provided which employs practically all of the moving parts of the engine and driving pulley, and which may be easily and quickly applied even by an unskilled operator.

It will be seen further that a very effective support has been provided which permits accurate alignment with subsequent positive locking in position.

It will be seen further that a very easy control has been provided for applying and disconnecting the load and that this control for the clutch may be very quickly and simply operated.

Although the invention has been described in considerable detail, it is to be understood that the invention may be variously embodied and is, therefore, to be limited only as claimed.

I claim:

The combination of a driven flywheel, a shaft extending axially of said flywheel, a roller bearing interposed between said flywheel and shaft, a support adjacent the outer end of said shaft, a clutch interposed between said flywheel and shaft, an operating lever for controlling said clutch, said lever extending transversely of said shaft and apertured to permit the passage of said shaft therethrough, said lever having a recess at one end, an adjusting screw having a pointed end bearing in said recess and constituting a fulcrum for said lever, a controlling screw having a pointed end located in the other recess of said lever, and a casing for said clutch and lever, both said screws being threaded through said casing.

In testimony that I claim the foregoing I have hereunto set my hand at Wausau, in the county of Marathon and State of Wisconsin.

THOMAS H. JACOB.